(12) United States Patent
Tokumasu et al.

(10) Patent No.: US 8,967,340 B2
(45) Date of Patent: Mar. 3, 2015

(54) PLATE ELEMENT, AND FRICTION CLUTCH DEVICE AND BRAKE DEVICE PROVIDED WITH THE PLATE ELEMENT

(75) Inventors: Jun Tokumasu, Hamamatsu (JP); Yoichiro Nakano, Hamamatsu (JP); Hirokazu Kojima, Hamamatsu (JP)

(73) Assignee: Kabushiki Kaisha F.C.C., Hamamatsu-Shi (JP)

( * ) Notice: Subject to any disclaimer, the term of this patent is extended or adjusted under 35 U.S.C. 154(b) by 110 days.

(21) Appl. No.: 13/261,403

(22) PCT Filed: Feb. 3, 2011

(86) PCT No.: PCT/JP2011/052255
§ 371 (c)(1),
(2), (4) Date: Aug. 17, 2012

(87) PCT Pub. No.: WO2011/105187
PCT Pub. Date: Sep. 1, 2011

(65) Prior Publication Data
US 2013/0015025 A1 Jan. 17, 2013

(30) Foreign Application Priority Data

Feb. 25, 2010 (JP) ................................. 2010-040958

(51) Int. Cl.
*F16D 65/12* (2006.01)
*F16D 13/64* (2006.01)
*F16D 55/24* (2006.01)
*F16D 65/02* (2006.01)
*F16D 69/00* (2006.01)

(52) U.S. Cl.
CPC .............. *F16D 13/648* (2013.01); *F16D 65/12* (2013.01); *F16D 55/24* (2013.01); *F16D 2065/1368* (2013.01); *F16D 2069/004* (2013.01)
USPC ................................. 188/218 XL; 192/107 C (58) Field of Classification Search
USPC ........... 188/218 XL, 218 R, 71.1; 192/107 C, 192/52.3, 52.6, 66.3, 70.14
See application file for complete search history.

(56) References Cited

U.S. PATENT DOCUMENTS

| 4,762,215 | A | * | 8/1988 | Flotow et al. | ............. | 192/107 C |
| 5,647,466 | A | * | 7/1997 | Umezawa | .................... | 192/70.14 |
| 5,678,675 | A | | 10/1997 | Dover et al. | ............... | 192/107 R |
| 5,779,017 | A | * | 7/1998 | Kleifges et al. | .............. | 192/52.6 |
| 5,788,035 | A | * | 8/1998 | Avers | ........................... | 192/30 V |
| 6,305,522 | B2 | * | 10/2001 | Busse et al. | ............... | 192/107 C |
| 2005/0126878 | A1 | | 6/2005 | Samie | ....................... | 192/113.36 |
| 2007/0062777 | A1 | | 3/2007 | Zagrodzki et al. | ........... | 192/70.2 |

FOREIGN PATENT DOCUMENTS

| JP | 04107324 | 4/1992 |
| JP | 4125317 | 4/1992 |

(Continued)

*Primary Examiner* — Pamela Rodriguez
(74) *Attorney, Agent, or Firm* — Michael Tobias (57) ABSTRACT

A friction clutch device includes clutch plates which are retained through meshing engagement on the inner peripheral surface of an outer case, which is rotatably driven by an engine. Each clutch plate includes a flat, annular pressing element which is pressed against a clutch friction plate for frictional contact therewith. Engagement protrusions are formed on the outer peripheral surface of the pressing element. The engagement protrusions fit into recessed engagement grooves provided on the outer case and mesh with the outer case. Projecting portions which project toward the inner peripheral surface of the outer case are formed on the outer peripheral surface of the pressing element.

16 Claims, 5 Drawing Sheets

(56) References Cited

FOREIGN PATENT DOCUMENTS

| JP | 05131903 | 5/1993 |
| JP | 7238952 | 9/1995 |
| JP | 2006242295 | 9/2006 |
| JP | 2009138901 | 6/2009 |
| JP | 2009168144 | 7/2009 |

* cited by examiner

PLATE ELEMENT, AND FRICTION CLUTCH DEVICE AND BRAKE DEVICE PROVIDED WITH THE PLATE ELEMENT

TECHNICAL FIELD

The present invention relates to a flat, annular plate element provided in a friction clutch device which is disposed between a prime mover and a driven body rotated and driven by the prime mover and which transmits drive force from the prime mover to the driven body or stops the transmission or in a brake device which brakes rotational motion provided by the prime mover. The plate element is supported through meshing engagement with a concave or convex holder-side engagement portion formed on the inner peripheral surface or outer peripheral surface of a tubular or rodlike holder. While being rotated, the plate element is pressed against or separated from a flat, annular counterpart element. The present invention also relates to a friction clutch device including such a plate element, and a brake device including such a plate element.

BACKGROUND ART

Conventionally, in a friction clutch device which is disposed between a prime mover and a driven body rotated and driven by the prime mover and which transmits drive force from the prime mover to the driven body or stops the transmission or in a brake device which brakes rotational motion provided by the prime mover, a flat, annular plate element is pressed against a flat, annular counterpart element, which is driven so as to rotate, so as to transfer rotational drive force between the plate element and the counterpart element, or so as to brake rotational motion of the counterpart element.

A plate element used in such a friction clutch device or brake device has a plurality of teeth radially projecting from the outer peripheral surface of a ring-shaped pressing element which is pressed against a clutch friction plate, as in the case of the clutch plate shown in below-mentioned Patent Document 1. The teeth formed on the outer peripheral surface of the plate element are engaged with recesses or grooves formed on the inner peripheral surface of an outer case which accommodates the plate element so that the plate element rotates as a single body with the outer case.

PRIOR ART DOCUMENTS

Patent Documents

Patent Document 1: Japanese Patent Application Laid-Open (kokai) No. H07-238952

However, since the above-mentioned plate element (clutch plate) is in meshing engagement with the outer case with a predetermined gap (so-called play) formed therebetween, the plate element can move relative to the outer case not only in the axial direction but also in the radial direction. Therefore, when the plate element is disengaged or separated from the clutch friction plate, because of the above-mentioned play, the weight of the clutch plate itself may cause the clutch plate to move within the outer case in the radial direction, and particularly in the downward direction.

If the plate element moves within the outer case in the radial direction, such as in the downward direction, the clearance between the outer peripheral surface of the plate element and the bottom wall of the outer case decreases in a lower region within the outer case. In some cases, the outer peripheral surface of the plate element and the bottom wall of the outer case come into contract with each other in a certain region, and the clearance in that region disappears. The present inventors considered that when the clearance between the outer peripheral surface of the plate element and the bottom wall of the outer case decreases, the fluidity of a functional fluid medium (e.g., clutch oil) present between the plate element and the clutch friction plate drops, which makes the functional fluid medium unable to function and increases so-called drag torque.

A state in which the functional fluid medium (e.g., clutch oil) is unable to function refers to a state in which the functional fluid medium fails to exhibit expected functions in a satisfactory manner, such as a function of cooling the plate element and the clutch friction plate and a function of removing dust present between the plate element and the clutch friction plate. Drag torque is torque which is transferred, by means of viscous resistance of the clutch oil, between the clutch friction plate and the plate element when they are separated from each other, due to the difference in rotational speed between the clutch friction plates and the plate element. Drag torque is one cause of an increase in the fuel consumption of a vehicle.

The present invention was accomplished in order to solve the above-described problem, and its object is to provide a plate element which can maintain the function of a functional fluid medium and reduce drag torque in a friction clutch device or a brake device. Another object of the present invention is to provide a friction clutch device including such a plate element, and a brake device including such a plate element.

SUMMARY OF THE INVENTION

In order to achieve the above-described object, the present invention provides a flat, annular plate element which is supported through meshing engagement with a concave or convex holder-side engagement portion formed on an inner peripheral surface or outer peripheral surface of a tubular or rodlike holder, and which is pressed against or separated from a flat, annular counterpart element while being rotated relative to the counterpart element, the plate element being characterized by comprising a flat, annular pressing element having an annular pressing portion which is pressed against the counterpart element for frictional contact therewith; a convex or concave plate-side engagement portion which is provided on an outer peripheral surface or inner peripheral surface of the pressing element facing the holder-side engagement portion of the holder and which is in meshing engagement with the holder-side engagement portion; and a projecting portion provided on the outer peripheral surface or inner peripheral surface of the pressing element facing the holder-side engagement portion of the holder, the projecting portion projecting in a radial direction of the pressing element.

According to this feature of the present invention, the plate element has a convex projecting portion formed on the outer peripheral surface or inner peripheral surface of the flat, annular pressing element thereof. Therefore, the convex projecting portion provided on the outer or inner peripheral surface of the plate element is present between the outer or inner peripheral surface of the plate element and the surface of the holder, which face each other within a friction clutch device or a wet-type brake device. As a result, even when the plate element moves in the radial direction (i.e., moves toward a portion of the holder) upon disengagement from the counterpart element, the fluidity of a functional fluid medium (e.g., clutch oil) is maintained, because the projecting portion prevents direct contact between the peripheral surface of the plate element and the surface of the holder, and the projecting portion forms a clearance adjacent to the projecting portion. The size of the clearance corresponds to the amount of projection of the projecting portion. As a result, it becomes possible to maintain the functions of the functional fluid medium and reduce drag torque in the friction clutch device or the brake apparatus. The present inventors by experiment found that a friction clutch device which employs the plate element of the present invention can reduce drag torque by about 30% to 50% compared with a friction clutch device which employs a conventional plate element.

Another feature of the present invention is as follows. In the above-described plate element, the projecting portion projects by an amount determined such that a clearance between the projecting portion and a surface of the holder which faces the projecting portion is smaller than a clearance between the holder-side engagement portion and the plate-side engagement portion.

According to this feature of the present invention, the projecting portion of the plate element projects by an amount determined such that the clearance between the projecting portion and the surface of the holder which faces the projecting portion becomes smaller than the clearance between the holder-side engagement portion provided on the holder and the plate-side engagement portion provided on the plate element. Conventionally, the amount by which the plate element can move in the radial direction is equal to the size of the clearance between the holder-side engagement portion provided on the holder and the plate-side engagement portion provided on the plate element. Therefore, the amount of radial movement of the plate element can be reduced compared with that of the conventional plate element by setting the amount of projection of the projecting portion of the plate element such that the clearance between the projecting portion and the surface of the holder which faces the projecting portion becomes smaller than the clearance between the holder-side engagement portion and the plate-side engagement portion. As a result, it becomes possible to guarantee a larger clearance between the holder and the plate element, to thereby guarantee the fluidity of the functional fluid medium in a more satisfactory manner. Thus, the functions of the functional fluid medium can be more reliably maintained and reduction of drag torque can be more reliably achieved.

Another feature of the present invention is as follows. In the above-described plate element, the projecting portion is formed on the outer peripheral surface or inner peripheral surface of the pressing element in at least three locations, and the pressing element is disposed, via the holder, within a friction clutch device in which the pressing element is pressed against the counterpart element such that the pressing element rotates together with the counterpart element so as to transmit rotational drive force.

According to this feature of the present invention, the projecting portion is formed on the outer peripheral surface or inner peripheral surface of the pressing element in at least three locations. Thus, in a friction clutch device in which the plate element rotates together with the counterpart element, a substantially uniform clearance is always maintained along the entire circumference of the plate element between the outer or inner peripheral surface of the plate element and the surface of the holder. Therefore, irrespective of the position where the plate element stops its rotation, the fluidity of the functional fluid medium between the holder and the plate element can be maintained at all times. Thus, the functions of the functional fluid medium can be adequately maintained and reduction of drag torque can be adequately achieved.

Another feature of the present invention is as follows. In the above-described plate element, the projecting portion is formed on the outer peripheral surface or inner peripheral surface of the pressing element in at least one location, and the pressing element is disposed, via the holder, within a brake device in which the pressing element is pressed against the counterpart element which rotates so as to brake rotational motion of the counterpart element.

According to this feature of the present invention, the projecting portion is formed on the outer peripheral surface or inner peripheral surface of the pressing element in at least one location. Thus, in a brake device in which the plate element is in non-rotatable with respect to the counterpart element, a clearance is formed between the outer or inner peripheral surface of the plate element and the surface of the holder at a location where the projecting portion is provided. By disposing the plate element such that the projecting portion is located at a position where the fluidity of the functional fluid medium should be guaranteed between the holder and the plate element, the fluidity of the functional fluid medium at that position can be guaranteed. In particular, in the case where the plate element is disposed in a vertically upright state, the plate element is apt to drop within a holding portion of the brake device due to its weight. In such a case, the plate element is disposed in a state in which the projecting portion of the plate element is positioned on the bottom side of the interior of the holding portion, whereby the fluidity of a functional fluid medium can be guaranteed at the bottom side. Thus, the functions of the functional fluid medium can be adequately maintained and reduction of drag torque can be adequately achieved. The functional fluid medium used in the brake device is air when the brake device is of a dry type, or oil when the brake device is of a wet type. That is, the brake device of the present invention encompasses a dry-type brake device in which air is present between the plate element and the counterpart element (e.g., a rotating disk), and a wet-type brake device in which oil is present between the plate element and the counterpart element.

Another feature of the present invention is as follows. In the above-described plate element, the projecting portion is formed in a region of the outer peripheral surface or inner peripheral surface of the pressing element, the region being located adjacent to the plate-side engagement portion.

According to this feature of the present invention, the plate element is configured such that the projecting portion is formed on the outer peripheral surface or inner peripheral surface of the pressing element so as to be located adjacent to a plate-side engagement portion. By virtue of this configuration, the projecting portion can be easily formed compared with the case where the projecting portion is formed on the plate-side engagement portion of the pressing element of the plate element. Namely, the plate-side engagement portion formed on the peripheral surface of the pressing element of the plate element must be formed with high accuracy in terms of shape and position because the plate-side engagement portion is engaged with the holder-side engagement portion of the holder. In the case where the projecting portion is formed on the outer peripheral surface or the inner peripheral surface of the pressing element of the plate element so as to be located in a region adjacent to the plate-side engagement portion, the projecting portion is only required to be formed with a rather low accuracy which guarantees that the projecting portion does not interfere with the inner or outer peripheral surface of the holder. Accordingly, the projecting portion can be readily formed, compared with the case where the projecting portion is provided on the plate-side engagement portion of the pressing element of the plate element.

The present invention can be implemented not only in the form of a plate element but also in the form of a friction clutch device including such a plate element and in the form of a brake device including such a plate element.

Specifically, the present invention provides a friction clutch device comprising a counterpart element which has a flat, annular shape and is rotatably supported; a flat, annular plate element which is rotatably supported through meshing engagement with a concave or convex holder-side engagement portion formed on an inner peripheral surface or outer peripheral surface of a tubular or rodlike holder and which is pressed against or separated from the counterpart element, wherein the friction clutch device transmits rotational drive force or stops the transmission by pressing the plate element against the counterpart element or separating the plate element from the counterpart element, the friction clutch device being characterized in that the plate element comprises a flat, annular pressing element having an annular pressing portion which is pressed against the counterpart element for frictional contact therewith; a convex or concave plate-side engagement portion which is provided on an outer peripheral surface or inner peripheral surface of the pressing element facing the holder-side engagement portion of the holder and which is in meshing engagement with the holder-side engagement portion; and a projecting portion provided on the outer peripheral surface or inner peripheral surface of the pressing element facing the holder-side engagement portion of the holder, the projecting portion projecting in a radial direction of the pressing element.

The present invention also provides a brake device comprising a counterpart element which has a flat, annular shape and is rotatably driven; a flat, annular plate element which is rotatably supported through meshing engagement with a concave or convex holder-side engagement portion formed on an inner peripheral surface or outer peripheral surface of a tubular or rodlike holder and which is pressed against or separated from the counterpart element, wherein the brake device brakes the rotating counterpart element by pressing the plate element against the counterpart element, the brake device being characterized in that the plate element comprises a flat, annular pressing element having an annular pressing portion which is pressed against the counterpart element for frictional contact therewith; a convex or concave plate-side engagement portion which is provided on an outer peripheral surface or inner peripheral surface of the pressing element facing the holder-side engagement portion of the holder and which is in meshing engagement with the holder-side engagement portion; and a projecting portion provided on the outer peripheral surface or inner peripheral surface of the pressing element facing the holder-side engagement portion of the holder, the projecting portion projecting in a radial direction of the pressing element.

MODES FOR CARRYING OUT THE INVENTION

Figure 1:
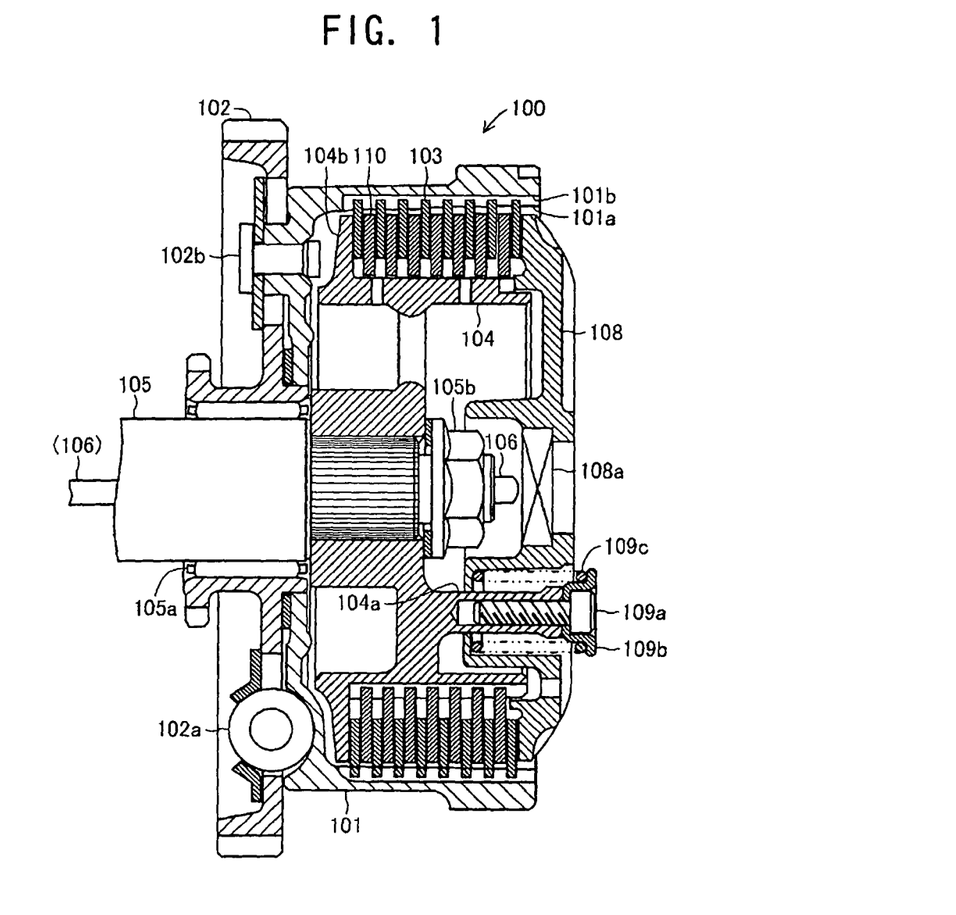
FIG. 1 is a sectional view schematically showing the overall structure of a friction clutch device according to one embodiment of the present invention.

One embodiment of a plate element of the present invention and a friction clutch device including the plate element will now be described with reference to the drawings. FIG. 1 is a sectional view showing the overall structure of a friction clutch device 100 which includes clutch plates 103 (corresponding to the plate element of the present invention). In each of the drawings which will be referred to herein, some components are shown schematically, such as in an exaggerated manner so as to facilitate an understanding of the present invention. Therefore, the dimensions, dimensional ratios, etc. of the constituent elements may differ from the actual dimensions, dimensional ratios, etc. The friction clutch device 100 is a mechanical device for transferring drive torque from an engine (not shown), which is the prime mover of a two-wheel vehicle (motorcycle), to a wheel (not shown), which is a driven body, and stopping the transfer of the drive torque. The friction clutch device 100 is disposed between the engine and a transmission (not shown).

(Structure of the Friction Clutch Device 100)

The friction clutch device 100 has an outer case 101 formed of an aluminum alloy. The outer case 101 is a member which is formed into the shape of a cylindrical tube with a bottom and which partially constitutes an enclosure of the friction clutch device 100. An input gear 102 is fixed, through a torque damper 102a, to the left-hand side surface of the outer case 101 as viewed in FIG. 1 by means of rivets 102b. The input gear 102 is in meshing engagement with an unillustrated drive gear which is driven and rotated by an engine. Thus, the input gear 102 is driven and rotated by the drive gear. Engagement grooves 101b for spline engagement are formed on the inner peripheral surface of the outer case 101, and a plurality (8 in the present embodiment) of clutch plates 103 are provided in a state in which they mesh with the engagement grooves 101b. The engagement grooves 101b extend in the axial direction of the outer case 101 and have a concave cross section. The plurality of engagement grooves 101b are spaced from one another in the circumferential direction of the inner peripheral surface 101a of the outer case 101.

Figure 2:
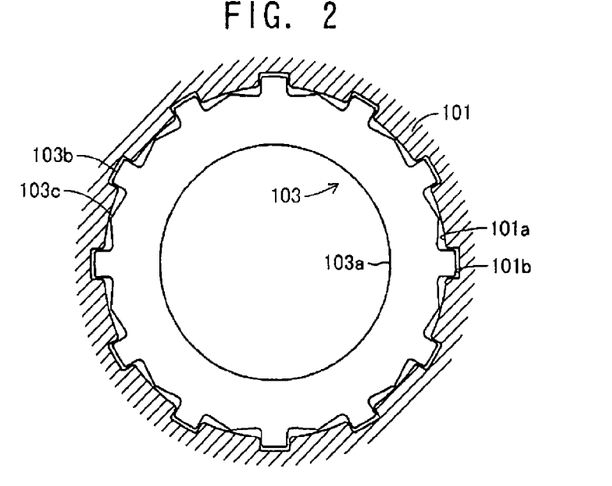
FIG. 2 is a plan view showing a clutch plate of the friction clutch device shown in FIG. 1 along with an outer case.
Figure 3:
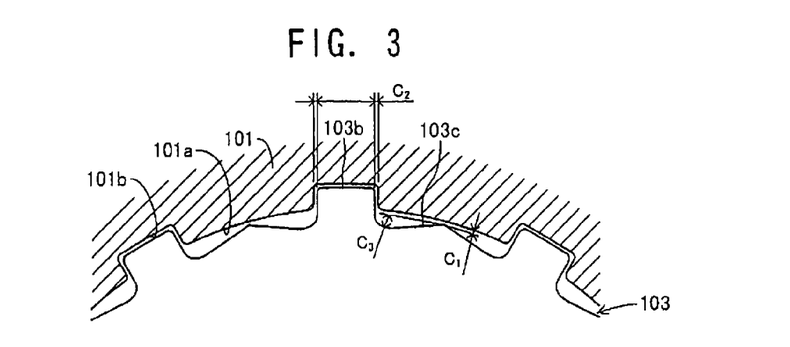
FIG. 3 is a partial enlarged plan view showing, on an enlarged scale, portions of the clutch plate and the outer case shown in FIG. 2.

Specifically, as shown in FIGS. 2 and 3, the clutch plates 103 are flat, annular members which are pressed against clutch friction plates 107, which will be described later. Each of the clutch plates 103 is mainly composed of a pressing element 103a, engagement protrusions 103b, and projecting portions 103c. Of these, the pressing element 103a is a plate-like member which is pressed against the clutch friction plate 107 and is formed in the shape of a ring having a width corresponding to the width of a pressing portion of the clutch friction plate 107 measured in the radial direction. Unillustrated oil grooves having a depth of several μm to several tens of μm are formed on opposite side surfaces (the front and back surfaces) of a ring-shaped pressing portion of each pressing element 103a, against which the clutch friction plate is pressed. Thus, clutch oil, which will be described later, is held on the opposite surfaces of the pressing portion. Surface hardening treatment is performed on the opposite side surfaces (the front and back surfaces) of each pressing element 103a on which the oil grooves are formed in order to enhance wear resistance. Since this surface hardening treatment does not directly relate to the present invention, it will not be described here.

The engagement protrusions 103b are portions which are engaged with the engagement grooves 101b of the outer case 101 and which project radially from the outer peripheral surface of the pressing element 103a. That is, the engagement protrusions 103b have a convex shape corresponding to the cross sectional shape of the engagement grooves 101b of the outer case 101 and loosely fit in the engagement grooves 101b. The engagement protrusions 103b are smaller than engagement portions 101b. The number of engagement protrusions 103b is the same as the number of engagement grooves 101b. In the present embodiment, the engagement protrusions 103b, which are 12 in number, are formed on the outer peripheral surface of the pressing element 103a at equal intervals.

Each of the projecting portions 103c projects radially from a region of the outer peripheral surface of the pressing element 103a, the region being located adjacent to the corresponding engagement protrusion 103b. More specifically, each projecting portion 103c has an approximately triangular shape formed by the region of the outer peripheral surface of the pressing element 103a located between adjacent engagement protrusions 103b, in which region the outer peripheral surface bulges outward with the amount of bulging gradually increasing toward the center of the region between the adjacent engagement protrusions 103b. In the present embodiment, the tip of each projecting portion 103c has a rounded shape (having a radius of about 0.5 mm).

The amount of projection of the projecting portions 103c is determined such that the clearance $C_1$ between the projecting portions 103c and the inner peripheral surface 101a of the outer case 101 becomes smaller than the clearance $C_2$ between each engagement protrusion 103b of the pressing element 103a and the corresponding engagement groove 101b of the outer case 101. The size of the clearance $C_2$ between each engagement protrusion 103b and the corresponding engagement groove 101b is equal to a value obtained by subtracting the width of the engagement protrusion 103b (measured in the direction perpendicular to the radial direction) from the width of the engagement grooves 101b. In the present embodiment, clearance $C_1$ is set to 0.15 mm and clearance $C_2$ is set to 0.25 mm; however, clearances $C_1$ and $C_2$ may be set as desired in accordance with the specifications of the friction clutch device 100.

Since the engagement protrusions 103b are fit into and engaged with the engagement grooves 101b of the outer case 101, the clutch plates 103 are held such that the clutch plates 103 can move in the axial direction relative to the outer case 101 and can rotate together with the outer case 101. In the present embodiment, the clutch plates 103 are formed by punching a thin SPCC (cold-rolled steel plate) into an annular shape. The outer case 101 corresponds to the holder of the present invention, the engagement grooves 101b correspond to the holder-side engagement portion of the present invention, and the engagement protrusions 103c correspond to the plate-side engagement portion of the present invention.

A friction plate holder 104 having a generally cylindrical shape is disposed inside the outer case 101 concentrically with the outer case 101. A large number of spline grooves extending in the axial direction of the friction plate holder 104 are formed on the inner peripheral surface of the friction plate holder 104. A shaft 105 is spline-engaged with the spline grooves. One end portion (the right end portion in FIG. 1) of the shaft 105, which has a hollow center, rotatably supports the input gear 102 and the outer case 101 through a needle bearing 105a, and fixedly supports, through a nut 105b, the friction plate holder 104 which is spline-engaged with that end portion. Thus, the friction plate holder 104 rotates together with the shaft 105. The opposite end portion (the left end portion in FIG. 1) of the shaft 105 is connected to the unillustrated transmission of the two-wheel vehicle.

A push rod 106 extends through the hollow space in the shaft 105 and projects from one end (the right end in FIG. 1) of the shaft 105. The end (the left end in FIG. 1) of the push rod 106 opposite the end portion thereof projecting from the one end portion (the right end portion in FIG. 1) of the shaft 105 is connected to an unillustrated clutch operating lever of the two-wheel vehicle. Therefore, when the clutch operating lever is operated, the push rod 106 slides within the hollow space in the shaft 105 in the axial direction of the shaft 105.

A plurality (7 in the present embodiment) of clutch friction plates 107 are held on the outer peripheral surface of the friction plate holder 104 by spline engagement such that the clutch friction plates 107 and the clutch plates 103 are alternatingly arranged, and such that the clutch friction plates 107 can move in the axial direction of the friction plate holder 104 and can rotate together with the friction plate holder 104.

Figure 4:
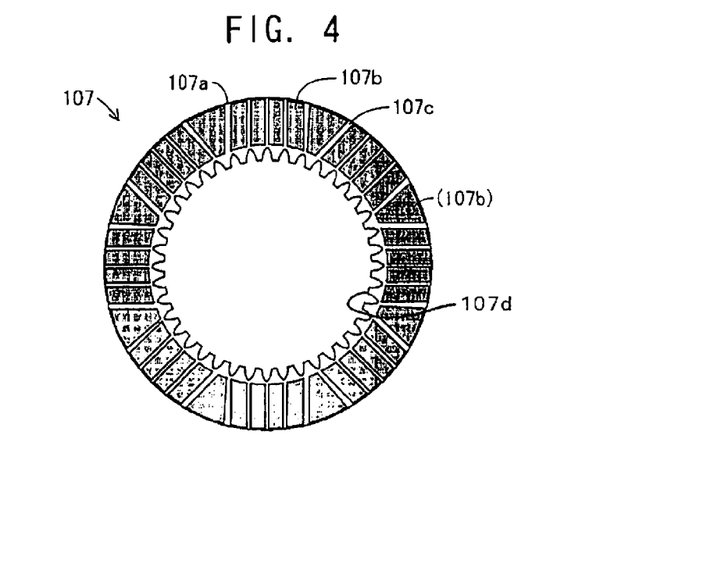
FIG. 4 is a plan view showing the exterior of a clutch friction plate of the friction clutch device shown in FIG. 1.

As specifically shown in FIG. 4, each clutch friction plate 107 has frictional sheets 107b and oil grooves 107c provided on a flat, annular metal core 107a. The metal core 107a is a member which serves as the base of the clutch friction plate 107, and it is formed by punching a thin SPCC (cold-rolled steel plate) into a generally annular shape. Internal spline teeth 107d for spline engagement with the friction plate holder 104 are formed on the inner peripheral surface of the metal core 107a. The clutch friction plate 107 has a plurality of small frictional sheets 107b provided on a side surface thereof facing the corresponding clutch plate 103, i.e., on a side surface of the metal core 107a facing the clutch plate 103. In FIG. 4, the frictional sheets 107b are shown with cross hatching.

The frictional sheets 107b are formed of paper which increases the frictional force to be applied to the clutch plates 103. Some of the frictional sheets 107b have a rectangular shape, and the remaining frictional sheets 107b have a triangular shape. The frictional sheets 107b have a length corresponding to the width of an annular portion of the metal core 107a measured in the radial direction. These frictional sheets 107b are disposed on the metal core 107a such that the frictional sheets 107b are spaced from each other and are bonded to the metal core 107a using an unillustrated adhesive. The gaps between adjacent frictional sheets 107b serve as oil grooves 107c. The oil grooves 107c function as oil passages through which clutch oil (to be described later) passes, and they have a depth corresponding to the thickness of the frictional sheets 107b. The frictional sheets 107b may be formed of a material other than paper, such as cork, rubber, or glass, as long as the selected material can increase the frictional force between the clutch friction plates 107 and the clutch plates 103. The clutch friction plates 107 correspond to the counterpart element of the present invention.

A predetermined amount of clutch oil (not shown) is charged into the interior of the friction plate holder 104, where three tubular support columns 104a are formed (FIG. 1 shows one of them). The clutch oil is supplied to the spaces between the clutch friction plates 107 and the clutch plates 103 so as to absorb frictional heat generated between the clutch friction plates 107 and the clutch plates 103, prevent wear of the frictional sheets 107b, and remove dust produced as a result of frictional engagement. Thus, this friction clutch device 100 is a so-called a wet-type multi-plate friction clutch device.

The three tubular support columns 104a project from the friction plate holder 104 to the outside in the axial direction of the friction plate holder 104 (the right-hand side in FIG. 1). A pressing force-applying cover 108, which is disposed concentrically with the friction plate holder 104, is fixed to the tubular support columns 104a via bolts 109a, support plates 109b, and coil springs 109c. The pressing force-applying cover 108 has the form of a generally circular disc having an outer diameter approximately equal to that of the clutch friction plates 107. The coil springs 109c press the pressing force-applying cover 108 toward the friction plate holder 104. A release bearing 108a which faces the distal end of the push rod 106 located on the right-hand side in FIG. 1 is provided at the center of the pressing force-applying cover 108.

(Operation of the Friction Clutch Device 100)

Next, operation of the friction clutch device 100 having the above-described structure will be described. As described above, the friction clutch device 100 is disposed between the engine and the transmission of a vehicle. As a result of operation of the clutch operating lever by an operator of the vehicle, the clutch device transfers drive force from the engine to the transmission or stops the transfer.

Specifically, when the operator of the vehicle retracts the push rod 106 (moves the push rod 106 to the left in FIG. 1) by operating the clutch lever (not shown), the distal end of the push rod 106 is disengaged from the release bearing 108a. As a result, by virtue of the elastic force of the coil springs 109c, the pressing force-applying cover 108 presses the clutch plates 103. Thus, the clutch plates 103 and the clutch friction plates 107 are pressed against one another while moving toward a support flange 104b formed on the outer peripheral surface of the friction plate holder 104, whereby the clutch plates 103 and the clutch friction plates 107 are frictionally coupled together. As a result, the drive force transmitted from the engine to the input gear 102 is transferred to the transmission via the clutch plates 103, the clutch friction plates 107, the friction plate holder 104, and the shaft 105.

In a state in which the clutch plates 103 and the clutch friction plates 107 are frictionally coupled together, the frictional coupling with the clutch friction plates 107 prevents the clutch plates 103 from moving in the radial direction. Therefore, the clutch plates 103 do not cause such movement (shift) in the radial direction. Also, in this case, of the clutch oil charged in the friction clutch device 100, a portion which exists near the inner peripheries of the clutch plates 103 and the clutch friction plates 107 moves toward the outer peripheries of the clutch plates 103 and the clutch friction plates 107 in accordance with the magnitude of centrifugal force generated as a result of rotation of the clutch plates 103 and the clutch friction plates 110. Thus, the clutch oil circulates within the friction clutch device 100.

When the operator of the vehicle advances the push rod 106 (moves the push rod 106 to the right in FIG. 1) by operating the clutch lever (not shown), the distal end of the push rod 106 pushes the release bearing 108a. As a result, the pressing force-applying cover 108 moves rightward in FIG. 1 against the elastic force of the coil springs 109c, i.e., it moves away from the clutch plates 103. Thus, the clutch plates 103 and the clutch friction plates 107 are released from a state in which they are pressed and coupled together while moving toward the pressing force-applying cover 108, whereby the clutch plates 103 and the clutch friction plates 107 are disengaged from one another. Consequently, the transfer of drive force from the clutch plates 103 to the clutch friction plates 107 is stopped, whereby the drive force transmitted from the engine to the input gear 102 is prevented from being transferred to the transmission.

In a state in which the clutch plates 103 and the clutch friction plates 107 are disengaged from one another, since the frictional coupling of the clutch plates 103 with the clutch friction plates 107 is eliminated, the clutch plates 103 can move in the radial direction. However, the projecting portions 103c are formed on the outer peripheral surfaces of the clutch plates 103, so the clutch plates 103 are restrained from moving in the radial direction relative to the inner peripheral surface 101a of the outer case 101. Therefore, the amount by which the clutch plates 103 which are disengaged from the clutch friction plates 107 can move downward due to their weight is very small. Specifically, the maximum amount by which the clutch plates 103 can move in the radial direction corresponds to the clearance $C_1$ between the distal ends of the projecting portions 103c of each clutch plate 103 and the inner peripheral surface 101a of the outer case 101.

A clearance $C_3$ having a size equal to or greater than the amount of projection of the projecting portions 103c is formed between the outer peripheral surface of the clutch plates 103 and the inner peripheral surface 101a of the outer case 101 at locations on opposite sides of each projecting portion 103c. This configuration guarantees the fluidity of clutch oil at the outer peripheries of the clutch plates 103 and the clutch friction plates 107. Thus, it becomes possible to avoid stagnation of the clutch oil, which would otherwise occur when the clutch plates 103 move in the radial direction and eliminate the clearance between the outer peripheral surface of each clutch plate 103 and the inner peripheral surface 101a of the outer case 101. Therefore, it becomes possible to prevent failure of the clutch oil to perform its functions (cooling function and dust removing function) and to prevent an increase in drag torque, which failure and increase would otherwise occur due to stagnation of the clutch oil.

Figure 5:
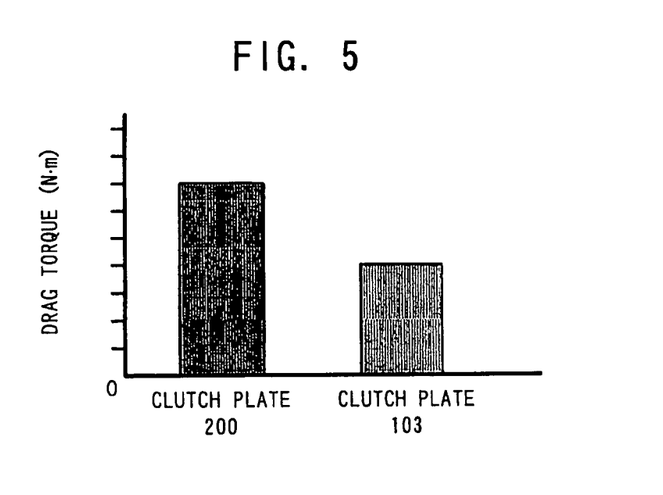
FIG. 5 is a graph showing drag torque produced in the friction clutch device shown in FIG. 1 for comparison with that produced in a conventional friction clutch device.
Figure 6:
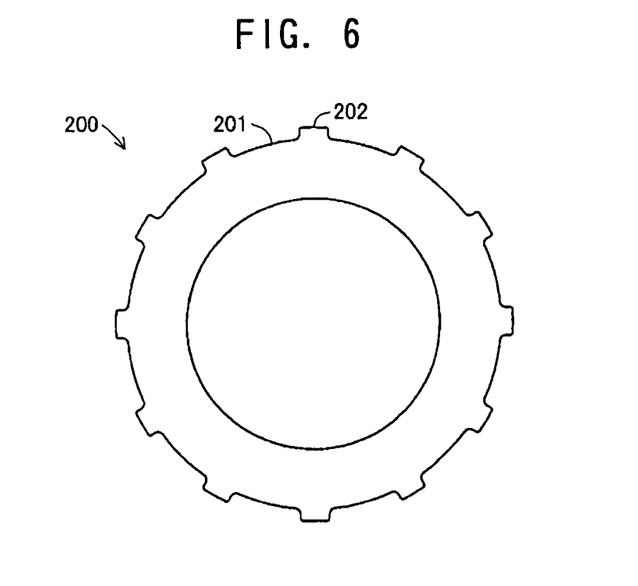
FIG. 6 is a plan view showing the exterior of a conventional clutch plate.

Results of an experiment carried out by the present inventors will now be described. FIG. 5 is a graph showing the magnitude of drag torque produced in the friction clutch device 100 including the clutch plate 103 of the present invention for comparison with that produced in an unillustrated friction clutch device including conventional clutch plates 200 shown in FIG. 6. As shown in FIG. 6, each of the clutch plates 200 has a pressing element 201 and engagement protrusions 202 which correspond to the pressing element 103a and the engagement protrusions 103b, respectively, of the clutch plates 103 according to the present invention. That is, the clutch plates 200 do not have portions corresponding to the projecting portions 103c of the clutch plates 103 of the present invention. The pressing element 201 of each clutch plate 200 has an outer diameter approximately equal to that of a circle which connects the crests of the projecting portions 103c of each clutch plate 103. The conventional friction clutch device is identical in structure with the friction clutch device 100 of the present invention except for the clutch plates 103, and the rotational speeds of the clutch plates 103 and the clutch friction plates 107 are 1000rpm.

As is apparent from the results of the experiment shown in FIG. 5, the friction clutch device 100 including the clutch plates 103 of the present invention reduces drag torque by about 30% compared with the friction clutch device including the conventional clutch plates 200. The present inventors confirmed by the experiment that the drag torque decrease became about 50% when the rotational speeds of the clutch plates 103 and the clutch friction plates 107 were set to 3000 rpm.

As can be understood from the above-described operation, in the present embodiment, each clutch plate 103 has the convex projecting portions 103c provided on the outer peripheral surface of each flat, annular pressing element 103a adjacent to the corresponding engagement protrusions 103b. Therefore, the convex projecting portions 103c provided on the outer peripheral surface of each clutch plate 103 are present between the outer peripheral surface of each clutch plate 103 and the inner peripheral surface 101a of the outer case 101, which face each other within the friction clutch device 100. As a result, even when the clutch plates 103 move in the radial direction (i.e., toward the outer case 101) upon disengagement from the clutch friction plates 107, the fluidity of the clutch oil is maintained, because the projecting portions 103c prevent direct contact between the outer peripheral surfaces of the clutch plates 103 and the inner peripheral surface 101a of the outer case 101, and each projecting portion 103c forms the clearance $C_3$ adjacent to the projecting portion 103c. As a result, it becomes possible to maintain the functions of the functional fluid medium and reduce drag torque in the friction clutch device 100.

The present invention is not limited to the above-described embodiment, and it may be modified in various ways without departing from the scope of the present invention. In the modifications described below, structural portions identical with those of clutch plate 103 according to the above-described embodiment are denoted by the same reference numerals as those used for clutch plate 103, and their descriptions will not be repeated.

For example, in the above-described embodiment, the projecting portions 103c formed on the outer peripheral surface of each clutch plate 103 (pressing element 103a) have a generally triangular shape as viewed in plan. However, the shape of the projecting portions 103c is not limited to that employed in the above-described embodiment, so long as the projecting portions 103c project from the outer peripheral surface of the clutch plate 103 and can form the clearance $C_3$ between the outer peripheral surface of the clutch plate 103 and the inner peripheral surface 101a of the outer case 101, which faces the outer peripheral surface.

Figure 7:
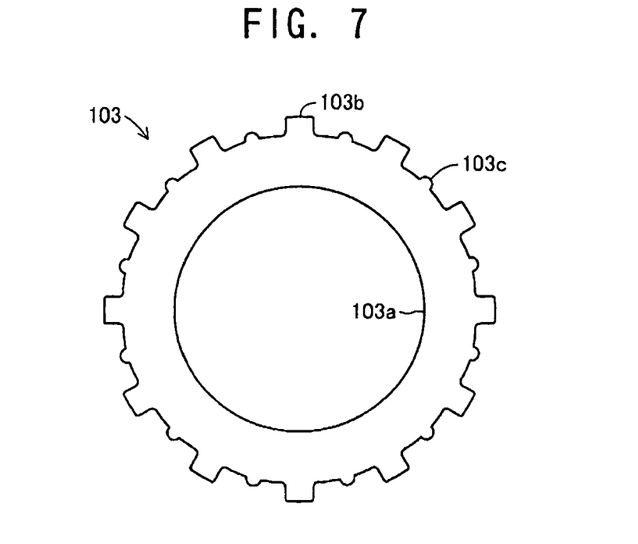
FIG. 7 is a plan view showing a clutch plate according to a modification of the present invention.
Figure 8:
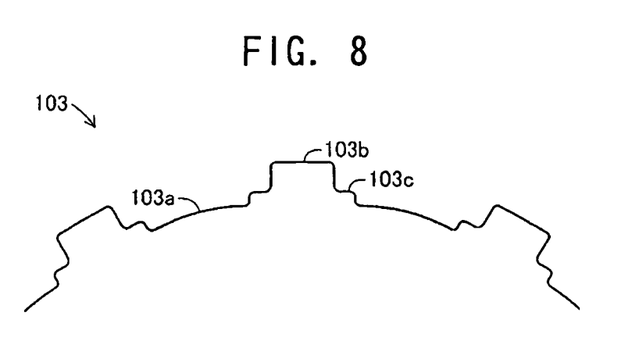
FIG. 8 is a partial enlarged plan view showing, on an enlarged scale, a portion of a clutch plate according to another modification of the present invention.

As an example, as shown in FIG. 7, the projecting portions 103c may be formed such that they project from the outer peripheral surface of each pressing element 103a and have a semicircular shape. Alternatively, as shown in FIG. 8, the projecting portions 103c may be formed on the outer peripheral surface of each pressing element 103a such that the projecting portions 103c form steps near the upwardly extending sides of the engagement protrusions 103b.

In the above-described embodiment, the projecting portions 103c of each clutch plate 103 are formed such that one projecting portion 103c is located between two adjacent engagement protrusions 103b of the clutch plate 103 (pressing element 103a). However, there is no limitation on the number of projecting portions 103c. By forming at least one projecting portion 103c on the outer peripheral surface of each clutch plate 103, the fluidity of clutch oil can be guaranteed at the location where the projecting portion 103c is formed.

In particular, in the case of a brake device (not shown) in which a plate element (corresponding to the clutch plate 103), which does not rotate with respect to a rotating counterpart element (corresponding to the clutch friction plate 107) is pressed against the counterpart element so as to brake the rotational motion of the counterpart element, one projecting portion 103c is formed on the outer peripheral surface of the plate element, and the plate element is disposed in a state in which the formed projecting portion 103c is positioned on the bottom side of the interior of a holding portion of the brake device. Thus, even in the case where the plate element drops to the bottom of the interior of the holding portion due to its weight, the fluidity of a functional fluid medium is guaranteed by the clearance $C_3$ formed by the projecting portion 103c located at the bottom. Therefore, it is possible to adequately maintain the functions of the functional fluid medium and reduce drag torque.

In this case, the functional fluid medium used in the brake device is air when the brake device is of a dry type and is oil when the brake device is of a wet type. That is, the brake device of the present invention encompasses a dry-type brake device in which air is present between the plate element and the counterpart element (e.g., rotating disk), and a wet-type brake device in which oil is present between the plate element and the counterpart element.

In the case of the friction clutch device of the above-described embodiment in which both the clutch friction plates 107 (counterpart elements) and the clutch plates 103 (plate elements) rotate, the projecting portions 103c are preferably formed on the outer peripheral surface of each clutch plate 103 in at least three locations. Thus, a substantially uniform clearance $C_3$ can be guaranteed along the entire circumference of each clutch plate 103, between the outer peripheral surface of the clutch plate 103 and the inner peripheral surface 101a of the outer case 101, which face each other within the friction clutch device 100. Therefore, irrespective of the position where the outer case 101 stops its rotation, the fluidity of clutch oil between the outer case 101 and the clutch plate 103 can be maintained more adequately, and drag torque can be reduced. Two or more projecting portions 103c may be formed between adjacent engagement protrusions 103b of the clutch plate 103.

In the present invention, the projecting portions 103c are formed on the outer peripheral surface of the pressing element 103a such that each projecting portion 103c is located midway between adjacent engagement protrusions 103b for the following reason. Since the engagement protrusions 103b are meshed and engaged with the engagement grooves 101b formed on the inner peripheral surface 101a of the outer case 101 such that a predetermined interfitting relation is established therebetween, the positional accuracy and forming accuracy of the engagement protrusions 103b must be high, and formation of the projecting portions 103c on the engagement protrusions 103b is difficult. In contrast, in the case where the projecting portions 103c are formed on the outer peripheral surface of each pressing element 103a, formation of the projecting portions 103c is easy, because if the projecting portions 103c are formed such that their amount of projection falls within a predetermined tolerance range, it is acceptable for the forming accuracy and positional accuracy to be relatively low.

Figure 9:
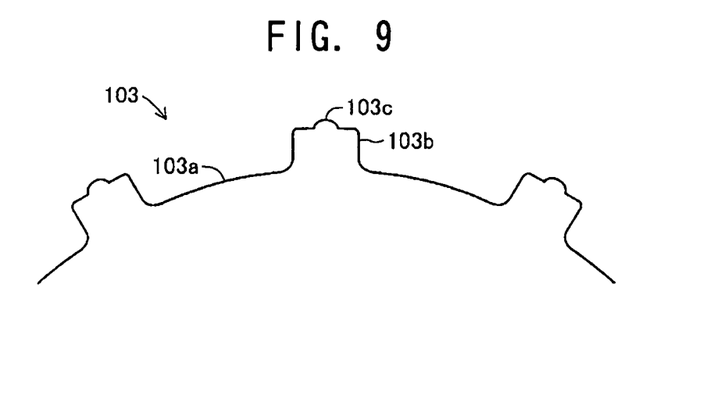
FIG. 9 is a partial enlarged plan view showing, on an enlarged scale, a portion of a clutch plate according to still another modification of the present invention.

However, the present invention does not exclude the case where the projecting portions 103c are formed on the engagement protrusions 103b. That is, as shown in FIG. 9, the projecting portions 103c may be formed on the engagement protrusions 103b formed on the outer peripheral surface of each pressing element 103a such that the projecting portions 103c project radially outward from the engagement protrusions 103b. In this case as well, effects similar to those attained by the above-described embodiment are expected.

In the above-described embodiment, the amount of projection of the projecting portions 103c of each clutch plate 103 is such as to form the clearance $C_1$ between the projecting portions 103c and the inner peripheral surface 101a of the outer case 101. However, the amount of projection is not limited to that employed in the above-described embodiment, so long as the amount of projection of the projecting portions 103c of each clutch plate 103 is determined such that the outer peripheral surface of each pressing element 103a partially bulges so as to form the clearance $C_3$. Accordingly, the amount of projection of the projecting portions 103c of each clutch plate 103 may be set to be smaller than the amount of projection employed in the above-described embodiment or greater than the amount of projection employed in the above-described embodiment. In this case, the amount of projection of the projecting portions 103c of each clutch plate 103 may be set such that the distal ends of the projecting portions 103c are always in contact with the inner peripheral surface 101a of the outer case 101.

In the above-described embodiment, the friction clutch device 100 is configured such that the clutch plates 103 are held, through meshing engagement, on the outer case 101, which is a drive-side rotating body, and the clutch friction plates 107 are held, through spline engagement, on the friction plate holder 104, which is a driven-side rotating body. However, the clutch plates 103 are not required to be provided on the drive-side rotating body, and may be provided on the driven-side rotating body. That is, the friction clutch device 100 may be configured such that the clutch friction plates 107 are held, through meshing engagement, on the outer case 101, which is a drive-side rotating body, and the clutch plates 103 are held, through meshing engagement, on the friction plate holder 104, which is a driven-side rotating body.

Figure 10:
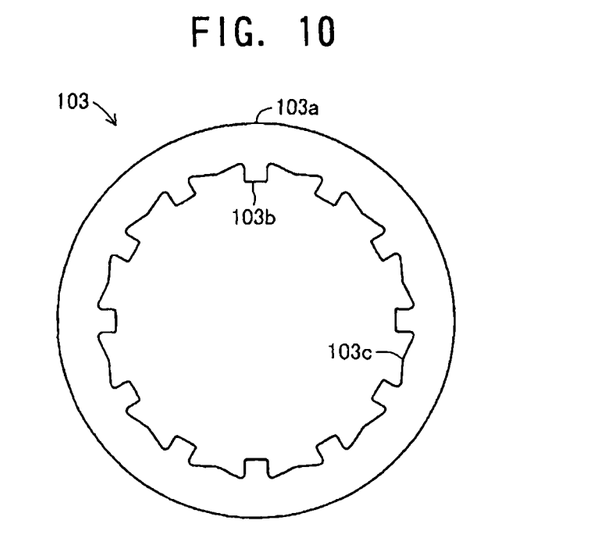
FIG. 10 is a plan view showing a clutch plate according to still another modification of the present invention.

In this case, for example, each of the clutch plates 103 may be configured such that, as shown in FIG. 10, the engagement protrusions 103b and the projecting portions 103c are formed on the inner peripheral surface of the pressing element 103a. That is, the engagement protrusions 103b and the projecting portions 103c are not required to be formed on the outer peripheral surface of each clutch plate 103, so long as the engagement protrusions 103b and the projecting portions 103c face the surface of the holder which is in meshing engagement with the clutch plates 103. In this case, through provision of the projecting portions 103c on the outer peripheral surface of each clutch friction plate 107 in meshing engagement with the outer case 101, which is a drive-side rotating body, radial movement of the clutch friction plates 107 within the outer case 101 can also be prevented.

In the above-described embodiment, the engagement grooves (recesses) 101b are formed on the inner peripheral surface 101a of the outer case 101, and the convex engagement protrusions 103b are formed on the outer peripheral surface of each pressing element 103a. However, the engagement grooves 101b and the engagement protrusions 103b are not limited to those employed in the above-described embodiment, so long as they can establish meshing engagement between the outer case 101 and the clutch plates 103. That is, the embodiment may be modified such that convex engagement protrusions are formed on the inner peripheral surface 101a of the outer case 101, and engagement grooves or recesses which come into meshing engagement with the engagement protrusions are formed on the outer peripheral surface of each clutch plate 103.

The shape, size, and number of clutch plates 103 employed in the above-described embodiment are freely determined in accordance with the specifications of the friction clutch device 100, and of course are not limited to those employed in the above-described embodiment.

In the above-described embodiment, an example has been described in which the plate element according to the present invention is applied to the clutch plates 103 of the friction clutch device 100. However, the plate element of the present invention should be widely interpreted as a flat, annular plate element which is supported through meshing engagement with a concave or convex holder-side engagement portion formed on the inner peripheral surface or outer peripheral surface of a tubular or rodlike holder, and which is pressed against or separated from a flat, annular counterpart element, while being rotated relative to the counterpart element. For example, the plate element of the present invention may be used as a plate element of the above-described brake device.

Description Of Reference Symbols And Numerals $C_1, C_2, C_3$ ... clearance, 100 ... clutch device, 101 ... outer case, 101a ... inner peripheral surface, 101b ... engagement groove, 102 ... input gear, 103 ... clutch plate, 103a ... pressing element, 103b ... engagement protrusion, 103c ... projecting portion, 104 ... friction plate holder, 105 ... shaft, 106 ... push rod, 107 ... clutch friction plate, 107a ... metal core, 107b ... friction sheet, 107c ... oil groove, 108 ... pressing force-applying cover.

The invention claimed is:

1. A flat, annular plate element which is supported through meshing engagement with a concave holder-side engagement portion formed on an inner peripheral surface of a tubular holder, and which is pressed against or separated from a flat, annular counterpart element while being rotated relative to the counterpart element, the plate element comprising:
   a flat, annular pressing element having an annular pressing portion which is pressed against the counterpart element for frictional contact therewith;
   a convex plate-side engagement portion which is provided on an outer peripheral surface of the pressing element facing the holder-side engagement portion of the holder and which is in meshing engagement with the holder-side engagement portion; and
   a projecting portion integrally formed on an outer peripheral surface of the plate-side engagement portion radially opposing the inner peripheral surface of the holder.

2. A plate element as claimed in claim 1, wherein a radial clearance between the projecting portion and the inner peripheral surface of the holder is smaller than a clearance between the holder-side engagement portion and the plate-side engagement portion.

3. A plate element as claimed in claim 2 wherein the projecting portion prevents a radially outer surface of the plate-side engagement portion from abutting against the inner peripheral surface of the holder radially opposing the plate-side engagement portion due to radial movement of the plate element with respect to the holder.

4. A plate element as claimed in claim 3 wherein the projecting portion contacts the inner peripheral surface of the holder radially opposing the plate-side engagement portion.

5. A plate element as claimed in claim 2 wherein the holder side engagement portion comprises a groove formed in the holder, and the plate-side engagement portion comprises a protrusion which extends in a radial direction of the plate element into the groove and has a widthwise side opposing a widthwise side of the groove for transmitting force between the plate element and the holder.

6. A plate element as claimed in claim 5 including a first projecting portion integrally formed on a first widthwise side of the protrusion and a second projecting portion integrally formed on a second widthwise side of the protrusion, wherein each of the first and second projecting portions defines a step having a radially outer surface opposing the inner peripheral surface of the holder adjoining the groove, and a radial clearance between the radially outer surface of each step and the inner peripheral surface of the holder is smaller than a clearance between the groove and the protrusion.

7. A plate element as claimed in claim 1, wherein:
the pressing element is disposed, via the holder, within a friction clutch device in which the pressing element is pressed against the counterpart element such that the pressing element rotates together with the counterpart element so as to transmit rotational drive force.

8. A plate element as claimed in claim 1, wherein:
the pressing element is disposed, via the holder, within a brake device in which the pressing element is pressed against the counterpart element which rotates so as to brake rotational motion of the counterpart element.

9. A plate element as claimed in claim 1 wherein the projecting portion is formed on a widthwise side of the plate-side engagement portion.

10. A plate element as claimed in claim 9 wherein the projecting portion defines a step on a widthwise side of the plate-side engagement portion, the step having a radially outer surface opposing the inner peripheral surface of the holder adjoining the holder-side engagement portion.

11. A plate element as claimed in claim 9 including a first projecting portion integrally formed on a first widthwise side of the plate-side engagement portion and a second projecting portion integrally formed on a second widthwise side of the plate-side engagement portion.

12. A plate element as claimed in claim 11 wherein each of the first and second projecting portions defines a step having a radially outer surface opposing the inner peripheral surface of the holder adjoining the holder-side engagement portion.

13. A plate element as claimed in claim 1 wherein the projecting portion projects radially outwards from a radially outer surface of the plate-side engagement portion into the holder-side engagement portion.

14. A plate element as claimed in claim 1 including at least three plate-side engagement portions provided on the outer peripheral surface of the pressing element and at least three projecting portions each integrally formed on one of the plate-side engagement portions.

15. A friction clutch device comprising a counterpart element which has a flat, annular shape and is rotatably supported, and a flat, annular plate element which is rotatably supported through meshing engagement with a concave holder-side engagement portion formed on an inner peripheral surface of a tubular holder, and which is pressed against or separated from the counterpart element, wherein the friction clutch device transmits rotational drive force or stops the transmission by pressing the plate element against the counterpart element or separating the plate element from the counterpart element, the plate element comprising:
a flat, annular pressing element having an annular pressing portion which is pressed against the counterpart element for frictional contact therewith;
a convex plate-side engagement portion which is provided on an outer peripheral surface of the pressing element facing the holder-side engagement portion of the holder and which is in meshing engagement with the holder-side engagement portion; and
a projecting portion integrally formed on an outer peripheral surface of the plate-side engagement portion radially opposing the inner peripheral surface of the holder.

16. A brake device comprising a counterpart element which has a flat, annular shape and is rotatably driven, and a flat, annular plate element which is rotatably supported through meshing engagement with a concave holder-side engagement portion formed on an inner peripheral surface of a tubular holder, and which is pressed against or separated from the counterpart element, wherein the brake device brakes the rotating counterpart element by pressing the plate element against the counterpart element, the plate element comprising:
a flat, annular pressing element having an annular pressing portion which is pressed against the counterpart element for frictional contact therewith;
a convex plate-side engagement portion which is provided on an outer peripheral surface of the pressing element facing the holder-side engagement portion of the holder and which is in meshing engagement with the holder-side engagement portion; and a projecting portion integrally formed on an outer peripheral surface of the plate-side engagement portion radially opposing the inner peripheral surface of the holder.

* * * * *